(12) United States Patent
Tian et al.

(10) Patent No.: US 8,980,798 B2
(45) Date of Patent: Mar. 17, 2015

(54) PRECIPITATION PREVENTION IN PRODUCED WATER CONTAINING HYDRATE INHIBITORS INJECTED DOWNHOLE

(75) Inventors: Jun Tian, League City, TX (US); Cheryl R. Bailey, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 456 days.

(21) Appl. No.: 13/053,497

(22) Filed: Mar. 22, 2011

(65) Prior Publication Data

US 2011/0240915 A1 Oct. 6, 2011

Related U.S. Application Data

(60) Provisional application No. 61/319,477, filed on Mar. 31, 2010.

(51) Int. Cl.
  C04B 33/04 (2006.01)
  C08L 77/12 (2006.01)
  C08L 33/26 (2006.01)

(52) U.S. Cl.
  CPC .............. C08L 77/12 (2013.01); C08L 33/26 (2013.01); C09K 2208/22 (2013.01)
  USPC ........................ 507/90; 252/70; 252/182.29

(58) Field of Classification Search
  USPC .................... 507/90; 252/70, 182.29
  See application file for complete search history.

(56) References Cited

U.S. PATENT DOCUMENTS

| | | | | |
|---|---|---|---|---|
| 5,397,553 A * | 3/1995 | Spencer | .......................... | 422/243 |
| 5,744,665 A * | 4/1998 | Costello et al. | .................. | 585/15 |
| 6,025,302 A * | 2/2000 | Pakulski | .......................... | 507/90 |
| 6,028,233 A | 2/2000 | Colle et al. | | |
| 6,117,929 A * | 9/2000 | Bakeev et al. | ................. | 524/376 |
| 6,245,955 B1 * | 6/2001 | Smith | .............................. | 585/15 |
| 6,359,047 B1 * | 3/2002 | Thieu et al. | .................... | 524/376 |
| 6,566,309 B1 | 5/2003 | Klug et al. | | |
| 6,756,345 B2 * | 6/2004 | Pakulski et al. | ................ | 507/246 |
| 6,905,605 B2 | 6/2005 | Klomp | | |
| 7,021,378 B2 * | 4/2006 | Prukop | ........................... | 166/279 |
| 7,615,516 B2 * | 11/2009 | Yang et al. | ....................... | 507/90 |
| 8,334,240 B2 * | 12/2012 | Acosta | ............................ | 507/90 |
| 8,728,325 B2 * | 5/2014 | Hussain et al. | ................ | 210/721 |
| 2003/0057158 A1 | 3/2003 | Klomp | | |
| 2004/0030206 A1 | 2/2004 | Dahlmann et al. | | |
| 2004/0200618 A1 * | 10/2004 | Piekenbrock | ............... | 166/305.1 |
| 2005/0261529 A1 | 11/2005 | Crosby et al. | | |
| 2006/0027369 A1 * | 2/2006 | Baycroft et al. | ............... | 166/300 |
| 2006/0094913 A1 * | 5/2006 | Spratt | .............................. | 585/15 |
| 2006/0106265 A1 | 5/2006 | Rivers et al. | | |
| 2009/0054268 A1 | 2/2009 | Leinweber et al. | | |
| 2009/0192053 A1 * | 7/2009 | Crews et al. | .................... | 507/201 |
| 2010/0087338 A1 * | 4/2010 | Acosta | ............................ | 507/90 |
| 2010/0163246 A1 * | 7/2010 | Balzcewski | .................... | 166/369 |
| 2012/0157351 A1 * | 6/2012 | Webber | ........................... | 507/90 |
| 2012/0318515 A1 * | 12/2012 | Cawiezel et al. | .............. | 166/310 |
| 2013/0333766 A1 * | 12/2013 | Fan et al. | ......................... | 137/13 |
| 2014/0106991 A1 * | 4/2014 | Acosta et al. | .................... | 507/90 |

OTHER PUBLICATIONS

ExxonMobil Chemical, "Aromatic 150 Fluid," Sales Specification, Product Sheet, 1 p., Feb. 2005.
Total Petrochemicals, "FAS-150", Product Data Brochure, 7 pp., Aug. 17, 2005.

* cited by examiner

*Primary Examiner* — Jane L Stanley
(74) *Attorney, Agent, or Firm* — Mossman Kumar & Tyler PC

(57) ABSTRACT

The precipitation of polymeric kinetic hydrate inhibitors (KHIs) in stored produced water is prevented or inhibited by incorporating a water immiscible solvent therein having a polarity index greater than about 3. The polymeric KHIs whose precipitation is inhibited or prevented include, but are not limited to, hyperbranched molecules, polyvinylcaprolactam, polyvinylpyrrolidone, and the like. Suitable water immiscible solvents include, but are not necessarily limited to, xylene, toluene, kerosene, mineral spirits, trimethylbenzene, cumene, heavy aromatic naphtha, ethylbenzene, polyethylbenzene, naphthalene, and mixtures thereof.

11 Claims, No Drawings

PRECIPITATION PREVENTION IN PRODUCED WATER CONTAINING HYDRATE INHIBITORS INJECTED DOWNHOLE

CROSS-REFERENCE TO RELATED APPLICATION

This application claims the benefit of U.S. Provisional Patent Application No. 61/319,477 filed Mar. 31, 2010.

TECHNICAL FIELD

The invention relates to methods and compositions for inhibiting the precipitation of polymeric kinetic gas hydrate inhibitors, and most particularly relates, in one non-limiting embodiment, to methods and compositions for inhibiting the precipitation of polymeric kinetic hydrocarbon hydrates in produced water in long term storage.

BACKGROUND

A number of hydrocarbons, especially lower-boiling or "light" hydrocarbons, in hydrocarbon formation fluids or natural gas are known to form hydrates in conjunction with the water present in the system under a variety of conditions—particularly at a combination of lower temperature and higher pressure. The hydrates usually exist in solid forms that are essentially insoluble in the fluid itself. As a result, any solids in a formation or natural gas fluid are at least a nuisance for production, handling and transport of these fluids. It is not uncommon for hydrate solids (or crystals) to cause plugging and/or blockage of pipelines or transfer lines or other conduits, valves and/or safety devices and/or other equipment, resulting in shut-down, loss of production and risk of explosion or unintended release of hydrocarbons into the environment either on land or off-shore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions.

Species that tend to form hydrates at hydrate forming conditions in the presence of water include lighter or low-boiling, $C_1$-$C_5$, hydrocarbon gases, non-hydrocarbon gases or gas mixtures at ambient conditions. Examples of such gases include, but are not necessarily limited to, methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, xenon, and mixtures thereof. These molecules are also termed hydrate-forming guest molecules herein. Other examples include various natural gas mixtures that are present in many gas and/or oil formations and natural gas liquids (NGL). The hydrocarbons may also comprise other compounds including, but not limited to CO, $CO_2$, COS, hydrogen, hydrogen sulfide ($H_2S$), and other compounds commonly found in gas/oil formations or processing plants, either naturally occurring or used in recovering/processing hydrocarbons from the formation or both, and mixtures thereof.

Generally, there are two broad techniques to overcome or control the hydrocarbon hydrate problems, namely thermodynamic and kinetic. For the thermodynamic approach, there are a number of reported or attempted methods, including water removal, increasing temperature, decreasing pressure, addition of "antifreeze" to the fluid and/or a combination of these. The kinetic approach generally attempts (a) to prevent the smaller hydrocarbon hydrate crystals from agglomerating into larger ones (known in the industry as an anti-agglomerate and abbreviated AA) and/or (b) to inhibit, retard and/or prevent initial hydrocarbon hydrate crystal nucleation; and/or crystal growth (known in the industry as a kinetic hydrate inhibitor and abbreviated KHI). Thermodynamic and kinetic hydrate control methods may be used in conjunction.

Kinetic efforts to control hydrates have included the use of different materials as inhibitors. For instance, onium compounds with at least four carbon substituents are used to inhibit the plugging of conduits by gas hydrates. Additives such as polymers with lactam rings have also been employed to control clathrate hydrates in fluid systems. These kinetic inhibitors are commonly labeled Low Dosage Hydrate Inhibitors (LDHI) in the art because they may be effectively used to inhibit hydrate formation at dosage levels relatively lower than other inhibitors. KHIs and even LDHIs are relatively expensive materials, and it is always advantageous to determine ways of lowering the usage levels of these hydrate inhibitors while maintaining effective hydrate inhibition.

Another particularly useful group of hydrate inhibitors include dendrimeric compounds and in particular hyperbranched polyester amides. Dendrimeric compounds are in essence three-dimensional, highly branched oligomeric or polymeric molecules comprising a core, a number of branching generations and an external surface composed of end groups. A branching generation is composed of structural units which are bound radially to the core or to the structural units of a previous generation and which extend outward from the core. The structural units may have at least two reactive monofunctional groups and/or at least one monofunctional group and one multifunctional group. The term "multifunctional" is understood as having a functionality of about 2 or higher. To each functionality a new structural unit may be linked, a higher branching generation being produced as a result. The structural units may be the same for each successive generation but they can also be different. The degree of branching of a particular generation present in a dendrimeric compound is defined as the ratio between the number of branchings present and the maximum number of branchings possible in a completely branched dendrimer of the same generation. The term "functional end groups" of a dendrimeric compound refers to those reactive groups which form part of the external surface. Branchings may occur with greater or lesser regularity and the branchings at the surface may belong to different generations depending on the level of control exercised during synthesis. Dendrimeric compounds may have defects in the branching structure, may also be branched asymmetrically or have an incomplete degree of branching in which case the dendrimeric compound is said to contain both functional groups and functional end groups. In one non-limiting embodiment herein, the term "highly branched" may refer to three-dimensional structures that contain a combination of at least 5 functional groups and/or at least 5 functional end groups. Alternatively or in addition to these parameters, "highly branched" dendrimeric compounds may have a number average molecular weight in the range of from about 1000 to about 5000, with a molecular weight distribution of as broad as about 2 to about 30.

Dendrimeric compounds have also been referred to as "starburst conjugates". Such compounds are described as being polymers characterized by regular dendrimeric (tree-like) branching with radial symmetry.

Functionalized dendrimeric compounds are characterized by one or more of the reactive functional groups present in the dendrimeric compounds having been allowed to react with active moieties different from those featured in the structural units of the starting dendrimeric compounds. These moieties can be selectively chosen such that, with regard to its ability to prevent the growth or agglomeration of hydrate crystals, the functionalized dendrimeric compound out performs the dendrimeric compound. All of these LDHIs are more fully described in U.S. Pat. No. 6,905,605 which is incorporated by reference herein in its entirety.

In addition to dendrimeric oligomers or polymers, suitable gas hydrate inhibitors also include linear polymers and copolymers, such as polymers and copolymers of vinylcaprolactam and/or vinylpyrrolidone, or "onium" compounds such as tetrabutylammonium bromide. Acceptable onium compounds include those mentioned in U.S. Patent Application Publication 2005/0261529 A1, incorporated by reference herein in its entirety.

Hydrate inhibitors are injected into flow lines of produced hydrocarbons, such as oil and gas, that come from subsea wells to prevent the formation of hydrates as the hydrocarbons are being transported to other operations, such as a production facility, the hydrate inhibitors stay with the aqueous phase of these streams unless they are subsequently separated out. These compositions are particularly useful for inhibiting, retarding, mitigating, reducing, controlling and/or delaying formation of hydrocarbon hydrates or agglomerates of hydrates in fluids, particularly those used in hydrocarbon recovery operations. The method may be applied to prevent or reduce or mitigate plugging of annular spaces, pipes, transfer lines, valves, and other conduits, and places or equipment downhole where hydro-carbon hydrate solids may form under conditions conducive to their formation or agglomeration.

The term "inhibiting" is used herein in a broad and general sense to mean any improvement in preventing, controlling, delaying, reducing or mitigating the formation, growth and/or agglomeration of hydrocarbon hydrates, particularly light hydrocarbon gas hydrates in any manner, including, but not limited to kinetically, thermodynamically, by dissolution, by breaking up, by anti-agglomeration other mechanisms, or any combination thereof. Although the term "inhibiting" is not intended to be restricted to the complete cessation of gas hydrate formation, it may include the possibility that formation of any gas hydrate is entirely prevented.

The terms "formation" or "forming" relating to hydrates are used herein in a broad and general manner to include, but are not limited to, any formation of hydrate solids from water and hydrocarbon(s) or hydrocarbon and non-hydrocarbon gas(es), growth of hydrate solids, agglomeration of hydrates, accumulation of hydrates on surfaces, any deterioration of hydrate solids plugging or other problems in a system and combinations thereof.

The term "low dosage" used with respect to low dosage hydrate inhibitors (LDHIs) as defined herein refers to volumes of less than 5 volume % (vol %) of the fluids susceptible to hydrate formation. In some non-limiting embodiments, the vol % for thermodynamic hydrate inhibitors may be considerably higher, which depends on both the system sub-cooling and hold time.

As noted, common KHIs and LDHIs are polymeric, including, but not necessarily limited to, HYBRANE® hyperbranched polymers available from DSM Hybrane, polyvinylcaprolactam (PVCap), polyvinylpyrrolidone, poly(vinylcaprolactam-co-vinylpyrrolidone), polyisopropylmethacrylamide, poly(N-vinyl-N-methylacetamide) (VIMA), poly(VIMA:VCap) copolymer, poly(isobutylacrylamide), hydroxy-ethyl cellulose and its derivatives, and mixtures thereof. Even though these KHIs have relatively low molecular weights, they are typically introduced into the fluids being treated in a solvent, such as monoethylene glycol (MEG), butyl glycol ether (BGE) and methanol (MeOH). These polymeric KHIs have shown some complications in aqueous phase at elevated temperatures, for instance, greater than 100° F. (38° C.), specifically, they tend to precipitate as solids which potentially present plugging problems.

In disposing of produced water in a subterranean aquifer, such as to ultimate dispose of waste water, it is generally assumed that a large amount of water is already present in the formation. Trying to re-solubilize already-formed precipitates, such as by using MEG, methanol (MeOH) or BGE would be expected to merely removing the polymer precipitates from the periphery of or the outside of the formation only temporarily, since polar solvents would play a role in preventing precipitating of the polymeric KHIs only when they are present in relatively high percentages of the aqueous phase. When they contact more water and are diluted further inside the aquifer, the polymeric KHIs would again precipitate out of the solvents and potentially block the formation, preventing further produced water from being introduced.

It is thus desirable to discover methods and compositions for inhibiting the formation of precipitates in produced water that is stored or disposed of.

SUMMARY

There is provided, in one non-limiting form, a method for inhibiting the precipitation of a polymeric kinetic hydrate inhibitor (KHI) from an aqueous composition containing water and at least one polymeric KHI. The method includes contacting the aqueous composition with a water immiscible solvent having a polarity index greater than about 3 in an amount effective to inhibit the precipitation of the polymeric KHI. In one non-limiting embodiment, at least a portion of water is produced water. The method also involves storing the produced water with the solvent in a storage facility. As defined herein a storage facility includes, but is not necessarily limited to, subterranean aquifers, subterranean formations, tanks, vessels, and combinations thereof. It will be appreciated that alternatively, the aqueous composition may be stored first and then the water immiscible solvent added thereto as long as the water immiscible solvent is sufficiently mixed with the aqueous composition to prevent or inhibit precipitation of the polymeric KHI from substantially all of the aqueous composition stored. The water may be "produced water", that is water produced as a by-product in the recovery of hydrocarbons (e.g. oil and gas) from a subterranean formation.

Additionally there is provided in another non-restrictive embodiment, an aqueous composition inhibited against the precipitation of polymeric kinetic hydrate inhibitors (KHIs), where the aqueous composition includes water, at least one polymeric KHI, and a water immiscible solvent having a polarity index greater than about 3, in an amount effective to inhibit the precipitation of the polymeric KHI, for instance as compared with an identical composition in identical conditions without the water immiscible solvent. Again, in one non-restrictive version, at least a portion of water is produced water.

DETAILED DESCRIPTION

Polymeric kinetic hydrate inhibitors (KHIs) are known to inhibit the formation of gas hydrates at hydrate forming conditions of high pressure and low temperature when water is present. For example, HYBRANE® hyperbranched polymers available from DSM Hybrane are known gas hydrate inhibitors, but these polymers have shown some complications in monoethylene glycol (MEG) at elevated temperatures, e.g. about 100 to about 300° F. (about 38 to about 149° C.). For instance, in some embodiments at temperatures above about 125° F. (52° C.) the polymeric KHIs precipitate out. When volumes on the order of 6000 barrels (954 m$^3$) of water a day are pumped into an aquifer for disposal, the precipitation of the polymeric KHIs may problematically block or clog the aquifer before the ultimate water disposal capacity of the aquifer is reached.

Otherwise, good solubility of both HYBRANE polymers and polyvinylcaprolactam (PVCap), another known gas hydrate inhibitor, has been observed in polar solvents. These gas hydrate inhibitors have relatively low molecular weights (for instance on the order of about 2000 to about 3000 number average molecular weight), but even so there are precipitation concerns when produced water containing them is introduced into a storage facility, such as a subterranean aquifer. Generally, there is not much information known about such aquifers. Assuming that there is already a large amount of water present inside the aquifer formation, solubilizing the polymeric KHIs by monoethylene glycol (MEG), methanol (MeOH) or butyl glycol ether (BGE) would be simply a measure to eradicate or redissolve the active polymeric KHIs off of the outside periphery or the outward and more accessible portions of the formation temporarily since polar solvents such as those mentioned would play a role in the polymeric KHIs' precipitation phase behavior only when they are present in a relative high percentage of the aqueous phase. That is, when they contact larger amounts of water and are diluted further inside the aquifer, the polymeric KHIs would precipitate out of these polar solvents and still potentially block and clog the formation.

There may be several possible technical protocols to address the problem of hydrate formation within produced water introduced into aquifers, including breaking up the active polymeric KHIs by hydrolysis, separating out the precipitant from the water before downhole injection and dissolving the hydrates back into the fluid system. As noted above, the use of polar solvents may not be the correct approach. Thus, the inventors have sought to identify water immiscible solvents that may be able to extract all or most of the polymeric KHIs into its own phase, even at elevated temperatures, while the entire system remains at relatively low viscosity.

A number of water immiscible solvents have been identified based on known polarities from the literature, while also taking into account the availability of such solvents in relatively large volumes at relatively low cost. Additionally, boiling points and flash points were considered in the selection of the solvents.

Water immiscible solvents expected to be useful include polar solvents having a polarity index of greater than about 3. The polarity index is a measure of the polarity of the solute-solvent interactions. It depends strongly on the organic solvent, and somewhat on the polar groups present in the phase. These solvents include, but are not necessarily limited to, one or more of, xylene, toluene, kerosene, mineral spirits, trimethylbenzene (including isomers 1,2,4-trimethylbenzene, 1,3,5-trimethylbenzene, and/or 1,2,3-trimethylbenzene), cumene, heavy aromatic naphtha, ethylbenzene, polyethylbenzene; naphthalene, and mixtures thereof. In some cases aromatic solvents work better, but it depends upon the active chemical structure of the polymeric KHIs. It has been discovered that for polar solvents, there is no apparent effect on precipitation with up to 2 vol % based on the water present. However for non-polar solvents a dramatic improvement in the prevention of polymeric KHI precipitation has been seen with COSDENOL 104 available from Total, which is a mixture of heavy aromatic naphtha (58%), trimethylbenzene (25%), xylene (19%) and cumene (7%), as well as with Aromatic 150 and xylene, even with solvent volumes as low as about 1 vol % based on the water present.

In general, "naphtha" does not have a specific definition and can refer to a number of different flammable liquid mixtures of hydrocarbons. One definition, found in N. Irving Sax, et al., *Hawley's Condensed Chemical Dictionary, Eleventh Edition*, Van Nostrand Reinhold, New York, 1987, p. 806 is that naphtha is a general term applied to refined, partly refined, or unrefined petroleum products and liquid products of natural gas, not less than 10% of which distill below 347° F. (175° C.) and not less than 95% of which distill below 464° F. (240° C.) when subjected to distillation in accordance with the Standard Method of Test for Distillation of Gasoline, Naphtha, Kerosene, and Similar Petroleum Products (ASTM D86). Heavy naphthas are rather denser types and are usually richer in naphthenes and aromatics. One definition of heavy aromatic naphtha is that it consists predominantly (greater than 50 volume %) of C9 to C11 aromatic or naphthenic hydrocarbons, most (a subset of greater than 50 vol %) of those of which have 10 carbon atoms.

Other particular products expected to be useful in the compositions and methods herein include, but are not necessarily limited to, Aromatic 150 Hydrocarbon Fluid available from ExxonMobil Chemical (greater than 99 vol % aromatics content but less than 1 ppm benzene), Aromatic 100 Hydrocarbon Fluid available from ExxonMobil Chemical (1,2,4-trimethylbenzene, 1,3,5-trimethylbenzene, and/or 1,2,3-trimethylbenzene, xylene and cumene with less than 1 ppm benzene), AS 160 available from Nisseki Chemicals Texas Inc. (99% polyethylbenzene residue and 1% naphthalene), and FINASOL 150 available from Total Petrochemicals (up to 99 wt % heavy aromatic naphthas, 5-15 wt % naphthalene and about 0.5 wt % polynuclear aromatics). Less pure organic solvents described in the paragraphs above may be used to confer lower cost to the finished products.

Polar solvents that did not work to prevent precipitation of the polymeric KHIs included isobutyl alcohol, methyl isobutyl ketone (MIBK) and ethyl acetate.

The organic phase of the aqueous composition inhibited against the precipitation of the polymeric KHIs may include, but not necessarily be limited to (1) stand-alone streams from commercial resources, (2) mixtures of different kinds, (3) produced water from the recovery of hydrocarbons from subterranean formations, e.g. the oil field, and (4) mixtures of produced hydrocarbon with commercial solvents.

The amount of water immiscible solvent ranges up to about 25 vol % of the water in the aqueous composition. Alternatively, the amount of water immiscible solvent ranges from about 1 independently to about 5 vol % of the water in the aqueous composition, in another non-limiting version from about 1 independently to about 2 vol %. As used herein with respect to parameter ranges the term "independently" means that any lower threshold may be combined with any upper threshold to give a suitable alternative range for the parameter. The water immiscible solvent may be mixed or introduced into the aqueous composition by any suitable technique or equipment including, but not limited to, in-line mixers, stirrers, paddles, etc. and the like.

The aqueous composition including the polymeric KHIs and the solvent in one non-limiting embodiment may have a viscosity less than 100 cP (0.1 Pa-sec) at room temperature (20° C.), an aqueous phase pH between about 1 independently to 13, and salinity up to 300,000 mg/L with system temperature in the range between about 85 to about 300° F. (about 29 to about 149° C.). In alternative embodiments, the aqueous composition may have a viscosity between about 1 independently to about 3 cP at room temperature and a pH between about 3 independently to about 11 and a salinity of less than sea water, that is, less than 3 wt % salt. Without the water immiscible solvents, the composition may be sticky, like a gum or glue, which makes pumping and/or separation difficult. The compositions must then be heated to reduce their viscosity and improve their mobility.

To some extent, the viscosity depends on the pumping capacity. In one non-limiting embodiment, the viscosity of the organic phase should not be more viscous than the crude oil from which the produced water is obtained (e.g. 100 cP (0.1 Pa-sec)) to keep its mobility, and should at least be of sufficiently low viscosity so that it may be pumped into the formation, aquifer or other storage facility easily. Viscosity also depends on the phase separation that occurs in the aqueous phase when the polymeric KHIs separate and which temperatures and salinity levels cause such phase separation or precipitation.

Other methods of addressing the problem of the polymeric KHIs precipitating upon storage include extraction of the polymeric KHIs from the water prior to storage (e.g. injection in an aquifer), such as from the produced water, which extraction may include heating the composition. Alternatively, adding more salt to the aqueous composition, that is, the produced water, may precipitate the polymeric KHIs out of the aqueous phase to facilitate their removal.

The brines mentioned herein may be any typical brines, such as those formed by salts including, but not necessarily limited to, chlorides, bromides, formates. Specific suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof. Brines of NaCl were used for the experimental study, but little difference was observed between NaCl and other salts with respect to the effect of precipitation of active KHI inhibitors.

Many modifications may be made in the compositions and methods of this invention without departing from the spirit and scope thereof that are defined only in the appended claims. For example, the polymeric hydrate inhibitors and water immiscible solvent may be different from those explicitly mentioned herein. Various combinations of water immiscible solvents alone or together other than those described here are also expected to be useful. Further, polymeric KHIs and water immiscible solvents herein used alone or together with mixtures of water, hydrocarbons and hydrate-forming guest molecules different from those exemplified herein would be expected to be successful within the context of this invention. The methods and compositions described herein are also expected to be useful in the disposal and/or storage of aqueous solutions in facilities other than subterranean aquifers, for instance storage tanks and separators.

The present invention may suitably comprise, consist or consist essentially of the elements disclosed and may be practiced in the absence of an element not disclosed. For instance, the method for inhibiting the precipitation of a polymeric kinetic hydrate inhibitor (KHI) from an aqueous composition containing water and at least one polymeric KHI may consist essentially of or consist of contacting the aqueous composition with a water immiscible solvent having a polarity index greater than about 3, as these components are defined in the claims, in an amount effective to inhibit the precipitation of the polymeric KHI and storing the produced water with the solvent in a storage facility.

Additionally, the aqueous composition inhibited against the precipitation of polymeric kinetic hydrate inhibitors (KHIs) may consist essentially of or consist of water, at least one polymeric KHI, and a water immiscible solvent having a polarity index greater than about 3, in an amount effective to inhibit the precipitation of the polymeric KHI. In another non-limiting embodiment, the method for inhibiting the precipitation of a polymeric kinetic hydrate inhibitor (KHI) from an aqueous composition containing water and at least one polymeric KHI may consist of or consist essentially of contacting the aqueous composition with a water immiscible solvent having a polarity index greater than about 3 in an amount effective to inhibit the precipitation of the polymeric KHI.

The words "comprising" and "comprises" as used throughout the claims is to interpreted "including but not limited to".

What is claimed is:

1. A method for inhibiting the precipitation of a polymeric kinetic hydrate inhibitor (KHI) from an aqueous composition containing water and at least one polymeric KHI comprising contacting the aqueous composition with a water immiscible solvent having a polarity index greater than about 3 in an amount effective to inhibit the precipitation of the polymeric KHI, where
   the polymeric KHI is selected from the group consisting of polyvinylcaprolactam, polyvinylpyrrolidone, poly(vinylcaprolactam-co-vinylpyrrolidone), polyisopropylmethacrylamide, poly(N-vinyl-N-methylacetamide) (VIMA), poly(VIMA:vinylcaprolactam) copolymer, poly(isobutylacrylamide), hydroxyethyl cellulose and its derivatives, and mixtures thereof, and
   the water immiscible solvent is selected from the group consisting of kerosene, mineral spirits, trimethylbenzene, cumene, ethylbenzene, polyethylbenzene, naphthalene, and mixtures thereof, where the amount of water immiscible solvent ranges up to about 5 vol % of the water in the aqueous composition.

2. The method of claim 1 where at least a portion of the water is produced from a subterranean formation in a hydrocarbon recovery operation.

3. The method of claim 1 where the aqueous composition comprising the polymeric KHI, water and the solvent comprises:
   a viscosity less than 100 cP,
   an aqueous phase pH between about 1 and about 13, and
   salinity up to 300,000 mg/L at a temperature in the range between about 85 to about 300° F.

4. A method for storing produced water in a storage facility comprising:

introducing the produced water into the storage facility, where the produced water contains a polymeric KHI selected from the group consisting of polyvinylcaprolactam, polyvinylpyrrolidone, poly(vinylcaprolactam-co-vinylpyrrolidone), polyisopropylmethacrylamide, poly(N-vinyl-N-methylacetamide) (VIMA), poly(VIMA:vinylcaprolactam) copolymer, poly(isobutylacrylamide), hydroxyethyl cellulose and its derivatives, and mixtures thereof; and contacting the produced water with a water immiscible solvent having a polarity index greater than about 3 in an amount effective to inhibit the precipitation of the polymeric KHI, where the water immiscible solvent is selected from the group consisting of kerosene, mineral spirits, trimethylbenzene, cumene, ethylbenzene, polyethylbenzene, naphthalene, and mixtures thereof, where the amount of water immiscible solvent ranges up to about 5 vol % of the water in the produced water.

5. The method of claim 4 where the storage facility is an underground aquifer.

6. The method of claim 1 where the water in the aqueous composition further comprises at least one salt and is a brine.

7. A method for inhibiting the precipitation of a polymeric kinetic hydrate inhibitor (KHI) from an aqueous composition containing water and at least one polymeric KHI comprising contacting the aqueous composition with a water immiscible solvent having a polarity index greater than about 3 in an amount of up to about 5 vol % of the water in the aqueous composition, where at least a portion of the water is produced from a subterranean formation in a hydrocarbon recovery operation, where the polymeric KHI is selected from the group consisting of polyvinylcaprolactam, polyvinylpyrrolidone, poly(vinylcaprolactam-co-vinylpyrrolidone), polyisopropylmethacrylamide, poly(N-vinyl-N-methylacetamide) (VIMA), poly(VIMA:vinylcaprolactam) copolymer, poly(isobutylacrylamide), hydroxyethyl cellulose and its derivatives, and mixtures thereof, and where the water immiscible solvent is selected from the group consisting of kerosene, mineral spirits, trimethylbenzene, cumene, ethylbenzene, polyethylbenzene, naphthalene, and mixtures thereof.

8. An aqueous composition inhibited against the precipitation of polymeric kinetic hydrate inhibitors (KHIs) comprising:
   water;
   at least one polymeric KHI selected from the group consisting of polyvinylcaprolactam, polyvinylpyrrolidone, poly(vinylcaprolactam-co-vinylpyrrolidone), polyisopropylmethacrylamide, poly(N-vinyl-N-methylacetamide) (VIMA), poly(VIMA:vinylcaprolactam) copolymer, poly(isobutylacrylamide), hydroxyethyl cellulose and its derivatives, and mixtures thereof; and
   a water immiscible solvent having a polarity index greater than about 3, in an amount effective to inhibit the precipitation of the polymeric KHI, where the water immiscible solvent is selected from the group consisting of kerosene, mineral spirits, trimethylbenzene, cumene, ethylbenzene, polyethylbenzene, naphthalene, and mixtures thereof, where the amount of water immiscible solvent ranges up to about 5 vol % of the water in the aqueous composition.

9. The composition of claim 8 where at least a portion of the water is produced from a subterranean formation in a hydrocarbon recovery operation.

10. The composition of claim 8 where the aqueous composition comprising the polymeric KHI, water and the solvent comprises:
   a viscosity less than 100 cP,
   an aqueous phase pH between about 1 and about 13, and
   a salinity up to 300,000 mg/L at a temperature in the range between about 100 to about 300 ° F.

11. An underground aquifer comprising the aqueous composition of claim 8.

* * * * *